United States Patent Office 3,261,862
Patented July 19, 1966

---

3,261,862
ESTERIFICATION OF STERICALLY HINDERED ALKANOIC ACIDS IN THE PRESENCE OF STOICHIOMETRIC AMOUNTS OF A BORON FLUORIDE COMPOUND
William E. Wellman, Edison, Stanley J. Brois, Westfield, and Alfred J. Rutkowski, Colonia, N.J., assignors to Esso Research and Engineering Company, a corporation of Delaware
No Drawing. Filed Sept. 24, 1962, Ser. No. 225,902
6 Claims. (Cl. 260—488)

This invention relates to a novel method for esterifying carboxylic acids. More particularly, this invention relates to a process for esterifying a sterically hindered carboxylic acid which is normally difficult to esterify and, in particular, acids with a neo structure, e.g.

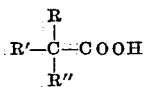

This invention also relates to other reactions of such acids. In a particular embodiment, this invention relates to the esterification of a hindered acid with an alcohol by a process which comprises a reaction of the hindered acid with a boron fluoride compound and a concomitant or subsequent reaction with the desired alcohol, to result in the preparation of an ester and recovery of boron fluoride compound for recycle.

It is generally known that some carboxylic acids are readily esterified by reaction with an alcohol and that there exists a number of commercial processes for the preparation of such esters. Esterification of lower normal alkanoic acids usually proceeds smoothly in the presence of an acid catalyst such as sulfuric acid, p-toluene sulfonic acid, as well as other acidic catalysts. Esterification of such acids generally only requires elevated temperatures and the presence of a conventional catalyst, the particular reaction temperature selected depending on the particular reactants employed, as well as on the activity of the catalyst. While esterification processes involving unhindered acids are well known and in commercial practice, the prior art has found it extremely difficult to esterify a sterically hindered acid with an alcohol employing the techniques generally described above at a reasonable reaction rate. It has now been found that hindered acids may be reacted with relative ease by the use of stoichiometric quantities of a boron fluoride compound.

In the case of esterification, the usual variables include the (1) acid reactant, (2) co-reactant, i.e. alcohol, (3) $BF_3$ compound, (4) temperature, (5) pressure, and (6) time of reaction. In addition to these major variables the separation, recovery, and recycle of $BF_3$ compound will be discussed in general for the sake of completion, although this phase of the present process does not relate to the heart of the invention.

Acid reactants amenable to the present process include any neo carboxylic acid, a neo carboxylic acid being defined herein as a carboxylic acid wherein the carboxyl group is attached to a tertiary carbon atom. By tertiary carbon atom it is meant a carbon atom which does not have attached to it an active hydrogen atom. In these neo acids the carbon atom attached to the carboxyl group viz., the "alpha carbon," will be connected to three organic radicals, each through a carbon atom. While monocarboxylic acids are most prevalent, the process of this invention will be equally adaptable to reactions involving di and polycarboxylic acids. (In short, therefore, the acids of this invention will be alkanoic acids having at least one tertiary alpha carbon atom.) The term "alkanoic acid" is intended to include cyclic and acyclic compounds, either mono, di, or polycarboxy compounds, as previously noted. A carboxyl group attached to a tertiary carbon atom will be referred to as a hindered carboxyl group.

To further clarify the definition of a neo carboxylic acid, reference may be had to the following structure:

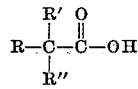

wherein each R is an organic radical.

In the most common case, R, R' and R" will represent an aryl or an alkyl group of from 1 to 20 carbon atoms, either straight chained, branched, cyclic or acyclic. The di- and polycarboxylic acids of this process will have one or more of the carboxyl groups attached to a tertiary carbon atom, e.g.,

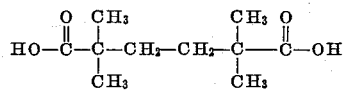

Where each carboxyl group in a polycarboxylic compound is attached to a tertiary carbon atom, the compound will be fully sterically hindered and will be most difficult to completely esterify. On the other hand, there are many di- and polycarboxylic acid compounds available wherein only one or, in any event, less than all, of the carboxylic groups is attached to a tertiary carbon atom. In this latter case, the unhindered carboxylic group will esterify readily by ordinary techniques. However, the hindered carboxyl group will be difficult to esterify and such esterification will be aided considerably by resort to the present invention.

In addition to the neo acid structure, other hindered acids are amenable to this process. As a general rule, normal or straight chained alkanoic acids are considered to be unhindered and readily esterifiable, whereas branchiness tends to create various degrees of steric hindrance. While neo acids are hindered and thus difficult to esterify, branching on the beta and gamma carbon atoms also results in substantial steric hindrance. Steric hindrance and its effect on esterification of specific acids is shown on page 205 of "Steric Effects on Organic Chemistry," edited by Melvin Newman (1956). As shown in this text, acetic acid exhibits the highest rate of esterification with the higher normal alkanoic acids also having a high rate. As evidenced by this text, the branched acids and especially those having tertiary alpha, beta or gamma carbon atoms, usually have an extremely low rate of esterification.

Having broadly defined the carboxylic acids which may be reacted in accordance with the present process, specific examples of these hindered mono, di, and polycarboxylic acids are listed below for purposes of illustration, it being understood that the specific list is for illustrative purposes only and not intended to define the scope of this invention. Homologs and analogs of the specific compounds listed and having a branched or tertiary alpha, beta or gamma carbon atom are within the framework of this invention.

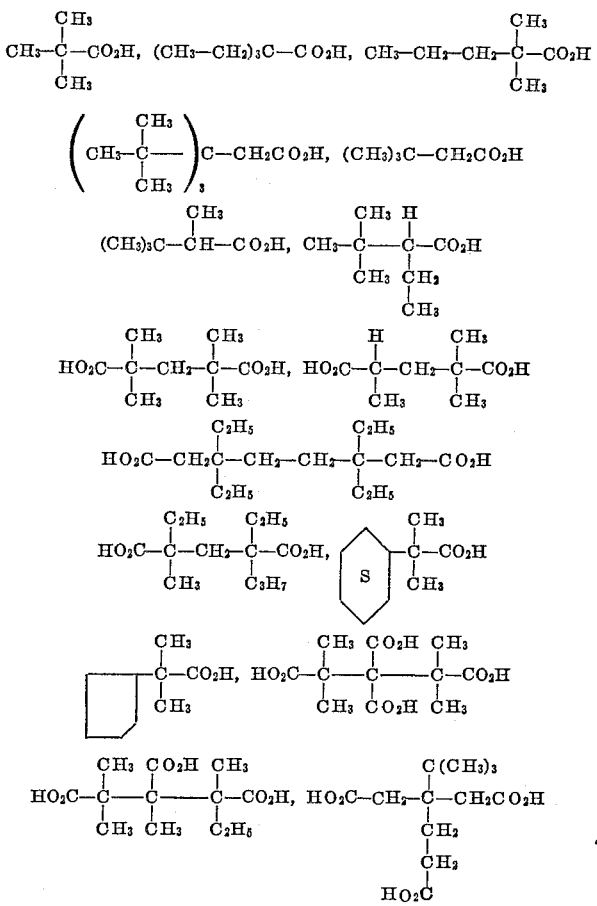

Halogen may be substituted for an alpha or beta hydrogen or R group in any of the above examples.

The co-reactant, that is, the alcohol employed in the esterification, may be any mono, di or poly alcohol obtainable in commerce. The most common alcohols used in esterification are the branched and straight-chained alcohols of from 1 to 30 carbon atoms in length and particularly $C_4$–$C_{20}$ alcohols. They may be primary, secondary, or tertiary alcohols. Alcohols derived by the well known oxo process are usually highly branched and are useful in this process; similarly, straight chained or moderately branched alcohols may be employed with equal success, the particular selection of the alcohol depending on the desired end product. At any rate, there is abundant literature available which recites a variety of alcohols useful in esterification processes. Typical alcohols include methyl alcohol, ethyl alcohol, butyl alcohol, hexyl alcohol, isooctyl alcohol, decyl alcohol, tridecyl alcohol, isopropyl alcohol, sec. butyl alcohol, tert. butyl alcohol, neopentyl alcohol, neoheptyl alcohol, neodecyl alcohol, neotridecyl alcohol, 2,2,4-trimethyl-pentanol, 2-ethylhexanol, cyclohexyl alcohol, ethylene glycol, butanediol, glycerine, neopentyl glycol, trimethylol propane.

Turning now to the boron fluoride compound employable, it has been found that any boron fluoride compound such as boron trifluoride, boron trifluoride monohydrate, boron trifluoride dihydrate, and boron trifluoride etherate are all useful in this process. Other boron fluoride compounds capable of complexing with carboxylic acids may be used. In accordance with a preferred embodiment of this invention, the boron trifluoride compound is first reacted with the organic acid to form what is believed to be a coordination complex referred to herein as the boron fluoride-acid complex.

This reaction takes place at a temperature of −80° C. to 200° C. and at pressures of atmospheric to 1000 p.s.i.g. The acid may be added to the boron fluoride compound or conversely the boron fluoride compound may be added to the acid. Sufficient boron fluoride compound to complex with all the carboxyl groups in the acid should be employed. These quantities will be referred to herein as stoichiometric amounts. In the case of a monocarboxylic acid, one mole of the boron fluoride compound will complex with one mole of acid. In the case of polycarboxylic acids, the moles of boron fluoride should correspond to the number of carboxyl groups in the polycarboxylic acid. If desired, excess boron fluoride compound may be used; however, no particular advantage is seen for the use of above stoichiometric amounts. A diluent, although not necessary, may be employed in this first stage complexing reaction, such as hydrocarbons, e.g., pentane, petroleum ether, heptane, iso-octane, cyclohexane, benzene, toluene, xylene, and the like; ethers, e.g., diethyl ether, di-isopropyl ether, tetrahydrofuran, dioxane, diglyme ($CH_3OCH_2CH_2OCH_2CH_2OCH_3$); halohydrocarbons, e.g., chloroform, carbon tetrachloride, trichloroethylene. It should be understood that this list is illustrative only and is not to be construed as limiting. Diluent amounts of 0.5 to 50 volumes/volume acid (on volume basis per acid) may be employed. Where a hydrated boron fluoride is employed, it is sometimes desirable to use an entrainer, such as benzene, toluene, xylene, ethyl chloride, anisole, to remove water during the esterification reaction. This is a conventional technique employed in esterification and other reactions which result in by-product water, to speed up the reaction and to drive it to completion.

After the first-stage reaction is completed and a boron fluoride-acid complex is obtained, the complex is then reacted with the selected alcohol to dissociate the complex and form the desired ester. This second-stage reaction may be carried out at 0° C. to 250° C. at pressures of atmospheric to 1000 p.s.i.g. The order of addition with respect to the reactants is not critical although it is preferred to add the acid complex to the alcohol. The alcohol, of course, should be present at least in stoichiometric amounts, corresponding to one hydroxyl group per carboxyl group to be esterified. Preferably, as in most esterifications, an excess of alcohol will be employed. A catalyst such as those normally employed for esterification is not needed.

The boron fluoride-acid complex formed in the first stage is in many cases readily separated from the reaction mixture since it often forms a separate lower layer which may be recovered by simple phase separation techniques. In a preferred embodiment the boron fluoride-acid complex is first separated and then added to excess alcohol. However, in the event the complex is soluble in the first-stage reaction product mixture, the entire reaction mixture may be reacted with alcohol to form the ester. A careful selection of solvent will aid in effecting an isolable complex phase. In some cases, the complex is a polar material which will form a separate phase when a non-polar solvent is used. For example, when pivalic acid is dissolved in a non-polar solvent, such as n-pentane or n-heptane and $BF_3$ gas is added, the acid-$BF_3$ complex readily forms a separate phase. In a particularly preferred embodiment, the diluent may be separated from the acid-complex, e.g., by evaporation and the isolated complex is then reacted with alcohol.

The following examples are illustrative of the present invention and are not intended to define or limit the scope thereof.

*Example 1*

To obtain ethyl pivalate the following procedure was employed: 5 grams of pivalic acid were added to 200 cc. of n-pentane solvent, the mixture being placed in a vessel equipped with a stirrer, gas inlet tube, thermowell and condenser. Gaseous $BF_3$ was then bubbled through the pivalic acid solution at ambient temperature, approximately 22° C., until all of the pivalic acid had complexed with $BF_3$ as evidenced by the evolution of excess $BF_3$. The $BF_3$-acid complex formed a lower layer which was separated from the pentane layer. This complex was then added in several stages to a flask containing 30 ml. of ethanol. The ethanol represented a substantial excess over that required to esterify the pivalic (neopentanoic) acid. After addition of the $BF_3$-acid complex to the ethanol, the mixture was refluxed over a period of 17 hours at 74° C. under nitrogen atmosphere. The esterification product was then cooled and analyzed by gas chromatography which indicated a 3.71 gram yield of ethyl pivalate. Analysis of the pentane layer showed 1.3 g. pivalic acid as the complex which had not separated out and was not subjected to the esterification. Therefore, 3.7 g. of pivalic acid (as the complex) was charged to the esterification reaction, and the 3.7 g. of ethyl pivalate represents a 77.2% yield. The ester which boils at 118° C. is recovered by fractionation.

Example 2

In this example, the two-stage process of Example 1 was repeated employing a shorter reaction time, a n-heptane solvent, and adding the $BF_3$-acid complex continuously to the ethanol as soon as it was formed by bubbling $BF_3$ through the neopentanoic acid. As in Example 1, 5 grams of pivalic acid were employed with 200 cc. n-heptane. Anhydrous gaseous $BF_3$ was bubbled through the mixture to obtain the $BF_3$-acid complex which was added as it formed to 30 cc. of absolute ethanol. In this example, the ethanol-acid complex solution was refluxed for 4 hours. Gas chromatographic analysis showed 1.1 g. pivalic acid in the heptane layer and 4.08 g. ethyl pivalate from the esterification solution, representing an 82.4% yield.

Example 3

The procedure of Example 2 was followed employing 5.0 grams of pivalic acid, 200 cc. of heptane, anhydrous $BF_3$ and 70 cc. of 2,2,4-trimethylpentanol-1. In this example the reaction mixture in the second or esterification stage was heated at 98 to 100° C. for 3 hours. Analysis indicated a yield of 4.23 grams of the corresponding ester, a yield of 51.9%.

Example 4

Example 1 was repeated employing 10.0 grams 2,2-dimethyl-pentanoic (neo-heptanoic) acid, 100 ml. n-heptane, anhydrous $BF_3$ and 30 ml. of ethanol. In this example $BF_3$ was bubbled through the heptanoic acid at essentially room temperature and the ethyl alcohol was then added slowly allowing the temperature to rise to about 50° C. The mixture was then refluxed at 81° C. for about 4 hours. The product was worked up in a manner similar to Example 1 and analysis indicated a yield of 9.6 grams, or 79% yield of ethyl neo-heptanoate.

Example 5

In this example esterification of pivalic acid was attempted with a Lewis acid catalyst. The procedure of Example 1 was followed with modifications made to accommodate the physical state of zinc chloride. In this example, 5 grams of pivalic acid were added to 50 ml. of heptane and 6.8 grams of zinc chloride with an additional 50 ml. of heptane. The mixture was then added to 30 ml. of absolute ethanol and refluxed for over 3 hours at 76° C. Analysis of the product indicated the yield of only 0.6% of ethyl pivalate.

Example 6

In this example, esterification of pivalic acid employing aluminum chloride as a catalyst was attempted. Employing comparable conditions, a yield of 17.3% ethyl pivalate was obtained.

To demonstrate the surprising results obtained by resort to the present two-stage process, reference is now had to the following table which compares esterification results of hindered acids employing various catalysts including $BF_3$, $ZnCl_2$, p-toluene-sulfonic acid and aluminum chloride:

ESTERIFICATION OF HINDERED ACIDS

| Acid | Alcohol | Catalyst | Catalyst, Mol Percent on Acid | Run Time, Hrs. | Temp., ° C. | Ester, Yield Percent |
|---|---|---|---|---|---|---|
| Pivalic | EtOH | $BF_3$ | 100 | 4 | 74 | 82 |
| Pivalic | TMP [1] | $BF_3$ | 100 | 3 | 99 | 52 |
| Neo-$C_7$ [3] | EtOH | $BF_3$ | 100 | 4 | 81 | 79 |
| Pivalic | EtOH | $ZnCl_2$ | 100 | 3 | 76 | 0.6 |
| Neo-$C_7$ [3] | EtOH | p-TSA [2] | 0.5 | 4 | 78 | 4.7 |
| Pivalic | EtOH | $AlCl_3$ | 200 | 4 | 80 | 17 |
| Neo-$C_7$ [3] | EtOH | p-TSA [2] | 0.5 | 24 | 78 | 22 |

[1] 2,2,4-trimethylpentanol.
[2] Para-toluenesulfonic acid.
[3] 2,2-dimethyl-pentanoic acid.

Example 7

In this example the procedure of Examples 1 and 2 were followed employing 13 grams 2,2-dimethyl-pentanoic acid (neoheptanoic acid), 9.5 ml. $BF_3 \cdot H_2O$, 100 ml. of n-heptane solvent and 60 ml. of absolute ethanol. In this case the BF hydrate which is liquid was added to the acid-solvent solution at 25° C. and with the addition an evolution of white fumes was noted. After all of the $BF_3 \cdot H_2O$ was added, the ethanol was introduced. After refluxing for several hours, workup of the product indicated a 9.10 gram or 57.6% yield of ethyl neoheptanoate.

Example 8

The procedure of Example 7 was followed employing $BF_3 \cdot 2H_2O$ as catalyst. In this example 13 grams of neoheptanoic acid were employed with 11.4 grams of $BF_3 \cdot 2H_2O$, 100 ml. n-heptane and 60 ml. of absolute ethanol. A 12.3 gram yield (77.8%) of ethyl neoheptanoate was obtained.

Example 9

In this example the procedure of Example 8 was followed employing 28 g. (0.2 mole) $BF_3$ etherate, 13 g. neoheptanoic acid, 100 ml. n-heptane, and 60 ml. absolute ethanol. After the $BF_3$ etherate was added to a solution of the neoheptanoic acid in heptane, the ethanol was added and the resulting solution was refluxed 4.5 hrs. at 71° C. An 8.78 g. yield (55.6%) of ethyl neoheptanoate was obtained.

In the preceding examples the boron fluoride compound was employed in stoichiometric or greater amounts, that is, 1 or more moles of boron fluoride compound per mole of monocarboxylic acid. It is to be understood that the reaction between the boron fluoride and acid may not be complete even with an excess of boron fluoride e.g., in a typical case only 80% of the carboxylic acid converted to the boron fluoride-acid complex. To show that these quantities of boron fluoride compound are necessary for the successful operation of the present process, reference is now had to the following Example 10 wherein an esterification was tried unsuccessfully using commonly employed catalytic amounts of a boron fluoride compound.

Example 10

The procedure of Example 1 was followed employing 0.39 g. (3% by weight based on neoheptanoic acid) $BF_3$ etherate, 13 g. neoheptanoic acid, and 60 ml. absolute ethanol. The solution was refluxed 4.5 hours at 78° C. Analysis showed 0.99 g. (6.3%) ethyl neoheptanoate.

While the preceding examples and discussion relate primarily to a two-step esterification process where a $BF_3$-acid complex was first formed and esterification with alcohol was carried out in a second stage, it is to be understood that this process can be carried out in a single stage if desired. This single-stage process would contemplate the in situ formation of the boron fluoride-acid complex in the presence of the alcohol reactant. Since the hindered acids of this invention are substantially inert to alcohols in the absence of a strong catalytic effect, the hindered carboxylic acid can be premixed with the desired alcohol, with or without a solvent, and the $BF_3$ compound may be added to the mixture with subsequent heating to form the desired ester. In this modified process it is theorized that the $BF_3$ compound first reacts with the hindered acid to form in situ, the $BF_3$-acid complex which is readily reacted with the alcohol under elevated temperatures as indicated previously.

*Example 11*

Pivalic acid (5.0 g.) is dissolved in 30 ml. absolute ethanol and $BF_3$ gas is passed through the solution for 10 minutes. The resulting solution is then refluxed for 4 hrs., giving 6.25 g. (95.2%) ethyl pivalate.

As broadly stated in the earlier portions of this specification, the $BF_3$-acid complex is amenable to reactions other than esterification. For example, by preforming a $BF_3$-acid complex, subsequent reaction with an ethylenimine will form a hydroxy amide in accordance with the following equation:

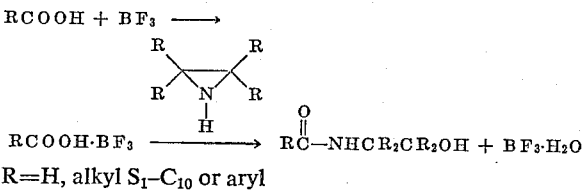

R=H, alkyl $S_1$-$C_{10}$ or aryl

Amino acids may be prepared in a similar manner by preforming the $BF_3$-acid complex and reacting it with cyanide to yield an alpha keto nitrile which in turn may be hydrolyzed with water to yield the keto acid which by known techniques may be subjected to reductive amination to form an amino acid. The following equations demonstrate these reactions:

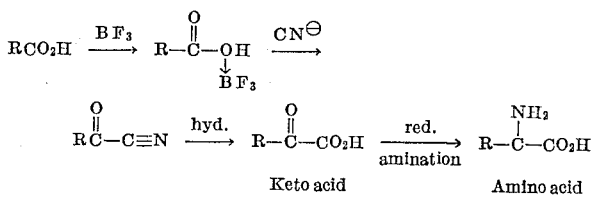

If desired, a half-ester of a dibasic acid can be prepared by reacting a dibasic acid with only sufficient boron fluoride compound to complex with one of the carboxy groups, which complex may then be reacted with an alcohol to yield the desired mono-ester. This is accomplished by employing an appropriate solvent system so that the mono-$BF_3$ complex separates as soon as it is formed, precluding formation of the di-$BF_3$ complex which would lead to diesters. This synthesis is demonstrated by the following equations:

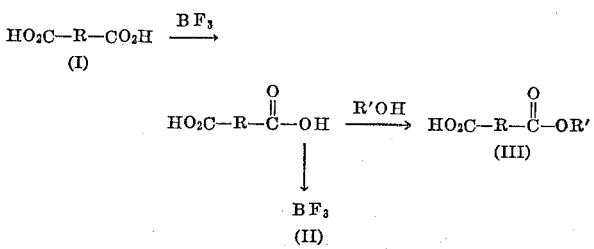

Hydroxy esters may be prepared by forming the $BF_3$-acid complex and reacting the complex with a cyclic ether to result in the desired hydroxy ester in accordance with the equations which follow:

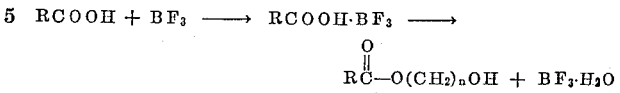

$n=2,3$

This method is particularly useful in preparing hydroxy esters from hindered carboxylic acids which are extremely difficult to esterify by conventional methods.

The $BF_3$ hydrate produced in the esterification reaction is readily dehydrated to give $BF_3$ which is then recycled.

From the above description and examples of various reactions, it is evident that the basic concept involved in the present disclosure relates to reactions of boron fluoride-acid complexes with a compound normally capable of reacting with acids. An important feature of this invention is that it enables one to react sterically hindered acids with co-reactants which under normal reaction conditions would be substantially inert to the hindered acid. Thus a host of derivatives of sterically hindered acids may be formed by reactions involving boron fluoride-sterically hindered acid complexes.

What is claimed is:

1. A process for esterifying a sterically hindered carboxylic acid which comprises reacting an alkanoic acid having at least one carboxyl group attached to a tertiary carbon atom with an amount of a boron fluoride compound sufficient to form a complex with said alkanoic acid containing one mol of boron fluoride compound per carboxyl group and reacting said complex with a branched or straight chain alcohol of from 1 to 30 carbon atoms to dissociate said complex and form the corresponding ester of said alkanoic acid.

2. A process in accordance with claim 1 wherein said boron fluoride compound is selected from the group consisting of boron trifluoride, boron trifluoride monohydrate, boron trifluoride dihydrate, and boron trifluoride etherate.

3. A process in accordance with claim 1 wherein said boron fluoride compound is boron trifluoride.

4. A process in accordance with claim 1 wherein said boron fluoride compound is boron trifluoride monohydrate.

5. A process in accordance with claim 1 wherein said boron fluoride compound is boron trifluoride dihydrate.

6. A process in accordance with claim 1 wherein said boron fluoride compound is boron trifluoride etherate.

References Cited by the Examiner

UNITED STATES PATENTS

| 2,378,009 | 6/1945 | Hanford et al. | 260—488 |
| 2,383,599 | 8/1945 | Glossop | 260—410.9 |
| 2,383,601 | 8/1945 | Keim | 260—410.9 |
| 2,852,470 | 9/1958 | Henne et al. | 260—485 X |

FOREIGN PATENTS

| 866,589 | 4/1961 | Great Britain. |

OTHER REFERENCES

Booth et al., "Boron Trifluoride and Its Derivatives," 1949, pages 185–194, John Wiley & Sons, Inc., N.Y.

Kastner, "Newer Methods of Preparative Or. Chem.," 1948, pp. 251–256, Interscience Publishers, Inc., N.Y.

Topchiev et al., "Boron Trifluoride and Its Compounds as Catalysts in Organic Chemistry." 1959, pages 211 to 221 and 267 to 269, Pergamon Press, N.Y.

LORRAINE A. WEINBERGER, *Primary Examiner.*

CHARLES B. PARKER, *Examiner.*

J. P. BRUST, D. P. CLARKE, V. GARNER,
*Assistant Examiners.*